(12) United States Patent
Zhou et al.

(10) Patent No.: US 7,876,305 B2
(45) Date of Patent: Jan. 25, 2011

(54) ELECTROPHORETIC DISPLAY DEVICE AND DRIVING METHOD THEREFOR

(75) Inventors: Guofu Zhou, Eindhoven (NL); Mark Thomas Johnson, Eindhoven (NL)

(73) Assignee: Adrea, LLC, Sunnyvale, CA (US)

( * ) Notice: Subject to any disclaimer, the term of this patent is extended or adjusted under 35 U.S.C. 154(b) by 294 days.

(21) Appl. No.: 10/515,461

(22) PCT Filed: May 12, 2003

(86) PCT No.: PCT/IB03/01973

§ 371 (c)(1),
(2), (4) Date: Nov. 22, 2004

(87) PCT Pub. No.: WO03/100515

PCT Pub. Date: Dec. 4, 2003

(65) Prior Publication Data

US 2006/0066558 A1    Mar. 30, 2006

(30) Foreign Application Priority Data

May 24, 2002  (EP)  .................... 02077017
Jan. 23, 2003  (EP)  .................... 03100133

(51) Int. Cl.
*G09G 3/34* (2006.01)
(52) U.S. Cl. ...................... 345/107; 359/296
(58) Field of Classification Search ............ 345/107, 345/690; 359/296
See application file for complete search history.

(56) References Cited

U.S. PATENT DOCUMENTS

| | | | |
|---|---|---|---|
| 4,041,481 A * | 8/1977 | Sato | ........................... 345/107 |
| 5,961,804 A | 10/1999 | Jacobson et al. | |
| 6,120,839 A | 9/2000 | Comiskey et al. | |
| 6,130,774 A | 10/2000 | Albert et al. | |
| 6,236,385 B1 * | 5/2001 | Nomura et al. | ............... 345/95 |
| 6,762,744 B2 * | 7/2004 | Katase | ....................... 345/107 |
| 7,012,600 B2 * | 3/2006 | Zehner et al. | ............... 345/214 |
| 2002/0021483 A1 * | 2/2002 | Katase | ....................... 359/267 |
| 2002/0196207 A1 * | 12/2002 | Machida et al. | ............... 345/55 |

FOREIGN PATENT DOCUMENTS

WO    WO9953373 A1    10/1999

* cited by examiner

*Primary Examiner*—Sumati Lefkowitz
*Assistant Examiner*—Seokyun Moon
(74) *Attorney, Agent, or Firm*—Finnegan, Henderson, Farabow, Garrett & Dunner, LLP

(57) ABSTRACT

An electrophoretic display has at least one pixel (18) which comprises electrophoretic material (8, 9), a first electrode (6) and a second electrode (5). An addressing circuit (16, 10) addresses the at least one pixel (18) by applying between the first electrode (6) and the second electrode (5): (i) a drive pulse (Vdr) with a level in accordance with an optical state to be reached by the at least one pixel (18), and (ii) a series of shaking pulses (SP) which have an energy content depending on an optical state of the at least one pixel (18).

10 Claims, 4 Drawing Sheets

Figure 1:
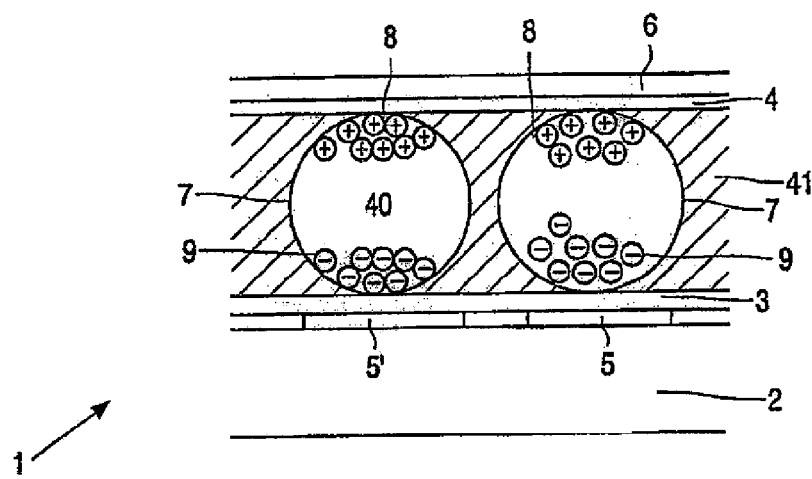

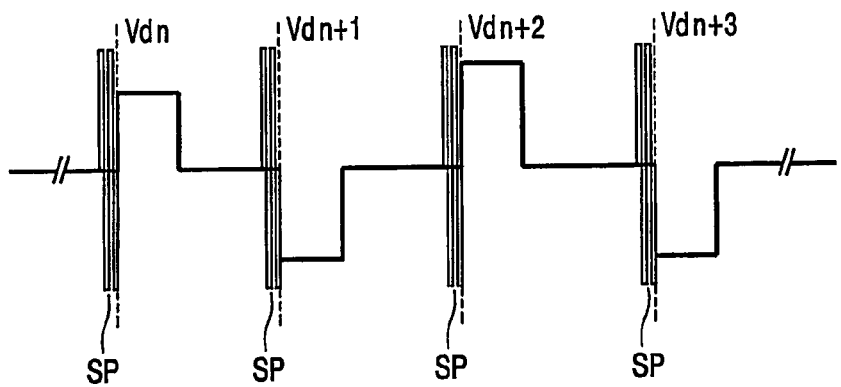
FIG. 3
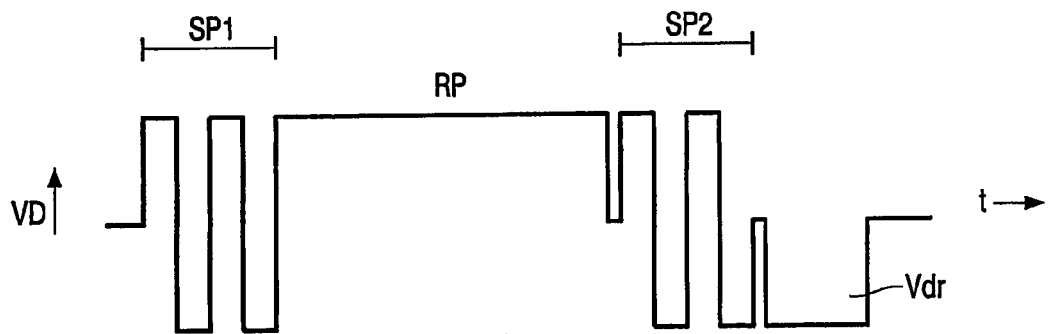
FIG. 4
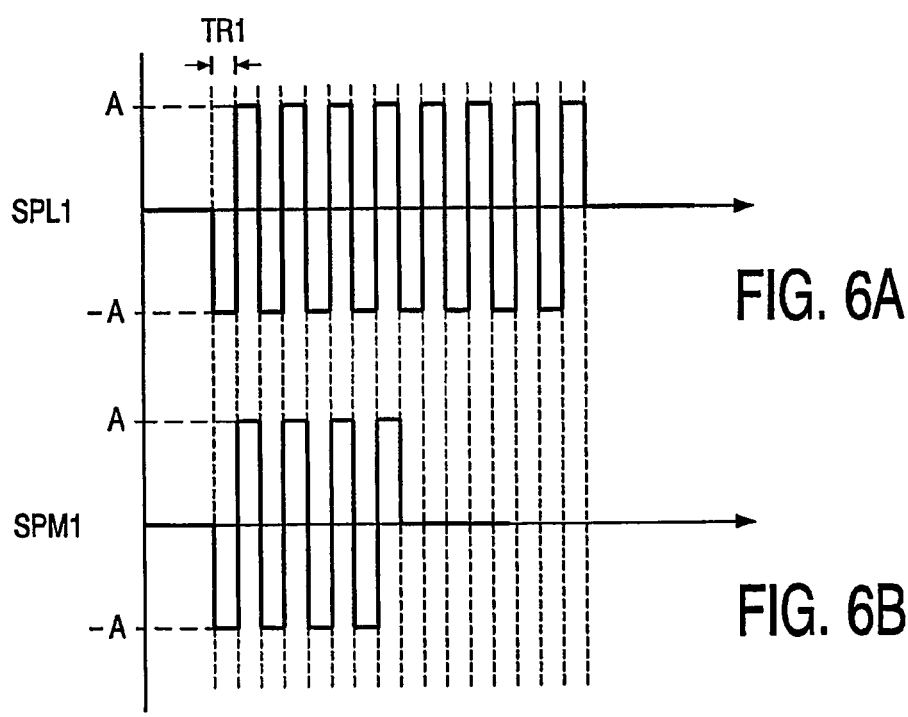
FIG. 6A
FIG. 6B

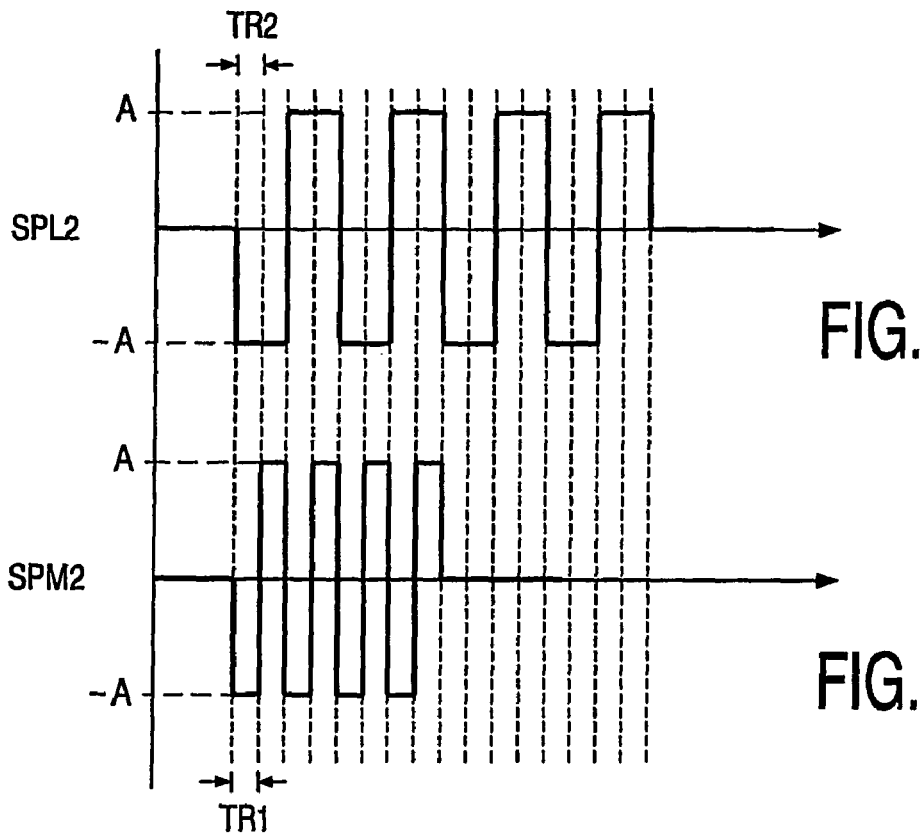
FIG. 7A
FIG. 7B
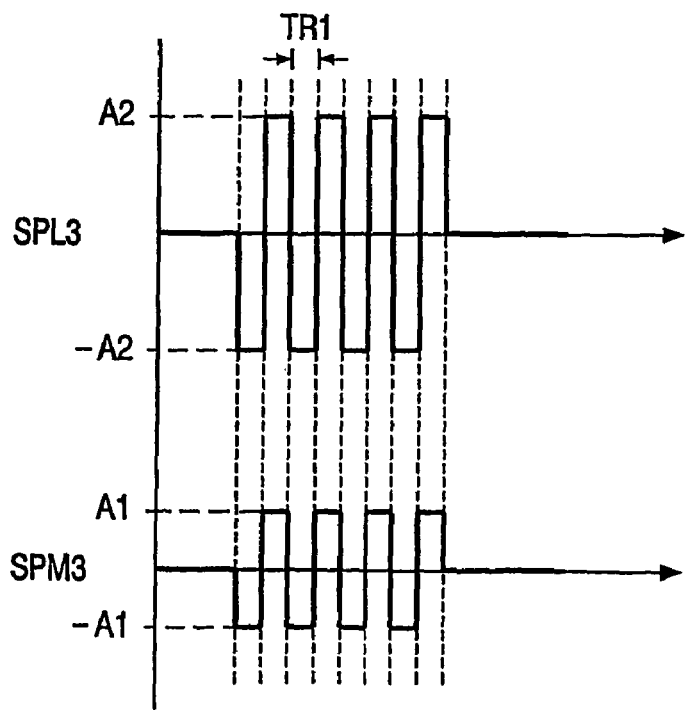
FIG. 8A
FIG. 8B

ELECTROPHORETIC DISPLAY DEVICE AND DRIVING METHOD THEREFOR

The invention relates to an electrophoretic display, a display apparatus comprising such an electrophoretic display, and a method of addressing such an electrophoretic display.

A display device of the type mentioned in the opening paragraph is known from international patent application WO 99/53373. This patent application discloses an electronic ink display which comprises two substrates, one of which is transparent, the other substrate is provided with electrodes arranged in rows and columns. Display elements or pixels are associated with intersections of the row and column electrodes. Each display element is coupled to the column electrode via a main electrode of a thin-film transistor (further referred to as TFT). A gate of the TFT is coupled to the row electrode. This arrangement of display elements, TFT's and row and column electrodes jointly forms an active matrix display device.

Each pixel comprises a pixel electrode which is the electrode of the pixel which is connected via the TFT to the column electrodes. During an image update or image refresh period, a row driver is controlled to select all the rows of display elements one by one, and the column driver is controlled to supply data signals in parallel to the selected row of display elements via the column electrodes and the TFT's. The data signals correspond to image data to be displayed.

Furthermore, an electronic ink is provided between the pixel electrode and a common electrode provided on the transparent substrate. The electronic ink is thus sandwiched between the common electrode and the pixel electrodes. The electronic ink comprises multiple microcapsules of about 10 to 50 microns. Each microcapsule comprises positively charged white particles and negatively charged black particles suspended in a fluid. When a positive voltage is applied to the pixel electrode, the white particles move to the side of the microcapsule directed to the transparent substrate, and the display element appears white to a viewer. Simultaneously, the black particles move to the pixel electrode at the opposite side of the microcapsule where they are hidden from the viewer. By applying a negative voltage to the pixel electrode, the black particles move to the common electrode at the side of the microcapsule directed to the transparent substrate, and the display element appears dark to a viewer. When the electric field is removed, the display device remains in the acquired state and exhibits a bi-stable character. This electronic ink display with its black and white particles is particularly useful as an electronic book.

Grey scales can be created in the display device by controlling the amount of particles that move to the common electrode at the top of the microcapsules. For example, the energy of the positive or negative electric field, defined as the product of field strength and time of application, controls the amount of particles moving to the top of the microcapsules.

The known display devices show a so-called image retention. After an image change still remnants of the previous image are visible.

From the non-pre-published patent applications in accordance to applicants docket referred to as PHNL020441 and PHNL030091 which have been filed as European patent applications 02077017.8 and 03100133.2 it is known to minimize the image retention by using pre-pulses also referred to as shaking pulses. Preferably, the shaking pulses comprise a series of AC-pulses, however, the shaking pulses may comprise a single pulse only. The pre-published patent applications are directed to the use of shaking pulses, either directly before the drive pulses, or directly before the reset pulse, or both.

The shaking pulses in accordance with the invention differ from the shaking pulses of the non-pre-published documents referred to above in that their energy depends on the optical state of the pixel. The energy of the shaking pulses may be varied by varying their amplitude, pulse width or duration or any combination thereof. In this way, both the image retention and the image update visibility due to the shaking pulses are reduced. The shaking pulses disclosed in the non-pre-published documents referred to above have a data independent amplitude, pulse width, and duration.

A first aspect of the invention provides an electrophoretic display as claimed in claim 1. A second aspect of the invention provides a display apparatus as claimed in claim 8. A third aspect of the invention provides a method of addressing an electrophoretic display as claimed in claim 9. Advantageous embodiments of the invention are defined in the dependent claims.

Although the shaking pulses reduce the image retention, they have influence on the optical state of the pixels. This is especially true if many shaking pulses are required to sufficiently reduce the image retention. The first aspect of the invention is based on the insight that shaking pulses which have an equal energy content cause different brightness disturbances for pixels in different optical states. To obtain more equal brightness disturbances for pixels in different optical states, the energy content of the shaking pulses is made dependent on the optical state of the pixels.

In an embodiment in accordance with the invention as defined in claim 2, the energy content of the shaking pulses is varied by controlling a number of the shaking pulses dependent on the optical state of a pixel. This is especially useful if the shaking pulses have a fixed amplitude and a fixed pulse width.

In an embodiment in accordance with the invention as defined in claim 3, the energy content of the shaking pulses is varied by controlling a pulse width of the pulses of the series of shaking pulses depending on the optical state of the at least one pixel. This is especial useful if the shaking pulses have fixed amplitude.

In an embodiment in accordance with the invention as defined in claim 4, the energy content of the shaking pulses is varied by controlling an amplitude of the pulses of the series of shaking pulses depending on the optical state of the at least one pixel. This is especially useful if the series of shaking pulses have a fixed duration.

The embodiment in accordance with the invention as defined in claim 5 is based on the insight that the nearer the optical state of the pixel is to one of the two limit states, the less the brightness disturbance due to the shaking pulses will be. If the electrophoretic display comprises white and black particles, the two limit states are white (the white particles which are near to the transparent electrode shield the black particles) and black (the black particles which are near to the transparent electrode shield the white particles). If the particles have other colors, the limit states will show other colors. Anyhow, in the limit states, one of the particles is near to the transparent electrode.

The effect of the shaking pulses on the optical state of a pixel depends on how many particles will change position with respect to being closest to the transparent electrode. If the pixel is in one of the limit states, a first type of particles is near to the transparent electrode while a second type of particles is far away from the transparent electrode: both particles types may move over a relatively large distance before a particle of the second type is closer to the transparent electrode than a particle of the first type. Thus, even with many or relatively high energy shaking pulses, the color of the pixel will hardly change. However, if a pixel displays a middle grey level, the particles are very near to each other, and only a small movement will influence the optical state of the pixel. Thus, already relatively low energy shaking pulse may influence the color of the pixel.

More in general, it is possible to use shaking pulses with relatively high energy content for pixels with an optical state near to the limit optical states while only minimally influencing the optical state of the pixels. For pixels with an optical state near to the average color of the limit optical states, the shaking pulses should have a relatively lower energy content to prevent too much influence on the optical state of the pixel.

In an embodiment in accordance with the invention as claimed in claim 6, the series of shaking pulses precedes a reset pulse which precedes the drive pulse.

In an embodiment in accordance with the invention as claimed in claim 7, the series of shaking pulses occurs in-between the reset pulse and the drive pulse.

These and other aspects of the invention are apparent from and will be elucidated with reference to the embodiments described hereinafter.

Figure 2:
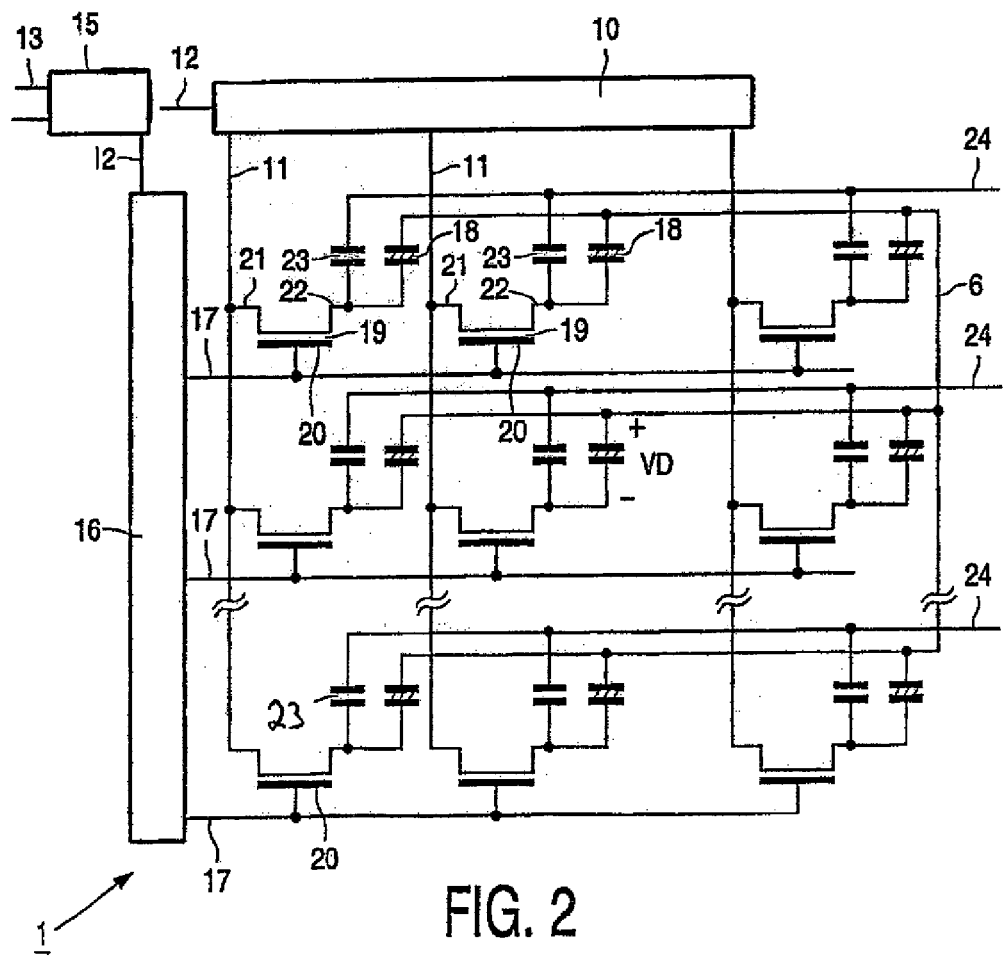

In the drawings:

FIG. 1 shows diagrammatically a cross-section of a portion of an electrophoretic display, FIG. 2 shows diagrammatically a picture display apparatus with an equivalent circuit diagram of a portion of the electrophoretic display, FIG. 3 shows shaking pulses immediately preceding drive pulses, FIG. 4 shows a pixel voltage comprising sequence of a series of shaking pulses, a reset pulse, a series of shaking pulses and a drive pulse, FIG. 5 shows the influence of shaking pulses on the brightness of a pixel, FIG. 6 shows an embodiment in accordance with the invention of shaking pulses of which an energy content depends on the optical state of the pixel, FIG. 7 shows an embodiment in accordance with the invention of shaking pulses of which an energy content depends on the optical state of the pixel, and FIG. 8 shows an embodiment in accordance with the invention of shaking pulses of which an energy content depends on the optical state of the pixel.

FIG. 1 shows diagrammatically a cross-section of a portion of an electrophoretic display, for example of the size of a few display elements, comprising a base substrate 2, an electrophoretic film with an electronic ink which is present between two transparent substrates 3 and 4 which, for example, are of polyethylene. One of the substrates 3 is provided with transparent pixel electrodes 5, 5' and the other substrate 4 with a transparent counter electrode 6. The electronic ink comprises multiple microcapsules 7 of about 10 to 50 microns. Each microcapsule 7 comprises positively charged white particles 8 and negatively charged black particles 9 suspended in a fluid 40. The dashed material 41 is a polymer binder. The layer 3 is not necessary, or could be a glue layer. When a positive voltage VD (see FIG. 2) is applied to the pixel electrode 5, 5' with respect to the counter electrode 6, an electric field is generated which moves the white particles 8 to the side of the microcapsule 7 directed to the counter electrode 6 and the display element will appear white to a viewer. Simultaneously, the black particles 9 move to the opposite side of the microcapsule 7 where they are hidden from the viewer. By applying a negative drive voltage VD between the pixel electrodes 5, 5' and the counter electrode 6, the black particles 9 move to the side of the microcapsule 7 directed to the counter electrode 6, and the display element will appear dark to a viewer (not shown). When the electric field is removed, the particles 7 remain in the acquired state and the display exhibits a bi-stable character and consumes substantially no power.

FIG. 2 shows diagrammatically a picture display apparatus with an equivalent circuit diagram of a portion of the electrophoretic display. The picture display device 1 comprises an electrophoretic film laminated on the base substrate 2 provided with active switching elements 19, a row driver 16 and a column driver 10. Preferably, the counter electrode 6 is provided on the film comprising the encapsulated electrophoretic ink, but, the counter electrode 6 could be alternatively provided on a base substrate if a display operates based on using in-plane electric fields. Usually, the active switching elements 19 are thin-film transistors TFT. The display device 1 comprises a matrix of display elements associated with intersections of row or selection electrodes 17 and column or data electrodes 11. The row driver 16 consecutively selects the row electrodes 17, while the column driver 10 provides data signals in parallel to the column electrodes 11 for the selected row electrode 17. Preferably, a processor 15 firstly processes incoming data 13 into the data signals to be supplied by the column electrodes 11.

The drive lines 12 carry signals which control the mutual synchronisation between the column driver 10 and the row driver 16.

The row driver 16 supplies an appropriate select pulse to the gates 20 of the TFT's 19 which are connected to the particular row electrode 17 to obtain a low impedance main current path of the associated TFT's 19. The gates of the TFT's 19 which are connected to the other row electrodes 17 receive a voltage such that their main current paths have a high impedance. The low impedance between the source electrodes 21 and the drain electrodes of the TFT's allows the data voltages present at the column electrodes 11 to be supplied to the drain electrodes which are connected to the pixel electrodes 22 of the pixels 18. In this manner, a data signal present at the column electrode 11 is transferred to the pixel electrode 22 of the pixel or display element 18 coupled to the drain electrode of the TFT if the TFT is selected by an appropriate level on its gate. In the embodiment shown, the display device of FIG. 1 also comprises an additional capacitor 23 at the location of each display element 18. This additional capacitor 23 is connected between the pixel electrode 22 and one or more storage capacitor lines 24. Instead of TFTs, other switching elements can be used, such as diodes, MIMs, etc. Electrophoretic media are known per se from e.g. U.S. Pat. Nos. 5,961,804, 6,120,839 and 6,130,774 and may be obtained from E-ink Corporation.

FIG. 3 shows shaking pulses immediately preceding drive pulses. The introduction of the shaking pulses SP preceding the drive pulses Vdn, Vdn+1, Vdn+2, Vdn+3 which are also referred to as Vdr reduces the image retention. Such a drive method is known from the non-prepublished patent application PHNL020441.

FIG. 4 shows a pixel voltage comprising a sequence of shaking pulses, a reset pulse, shaking pulses and a drive pulse. The reset pulse RP of the pixel voltage VD is introduced to reset the display to one of the limit optical states. If black and white particles are used, in the limit optical states either the black or the white particles are near to the transparent electrode and the viewer sees a black or a white display, respectively. The use of the reset pulse RP preceding the drive pulse Vdr improves the gray scale display as the drive pulse Vdr changes the optical state from the well defined one of the limit states. Thus, the drive pulse Vdr determines the gray level of the pixel with improved accuracy. The shaking pulses SP1 precede the reset pulse RP, the shaking pulses SP2 occur in-between the reset pulse RP and the drive pulse Vdr. Such a drive method is known from the non-prepublished patent application PHNL030091.

It is possible to either use the shaking pulses SP1 or SP2 only.

Figure 5A:
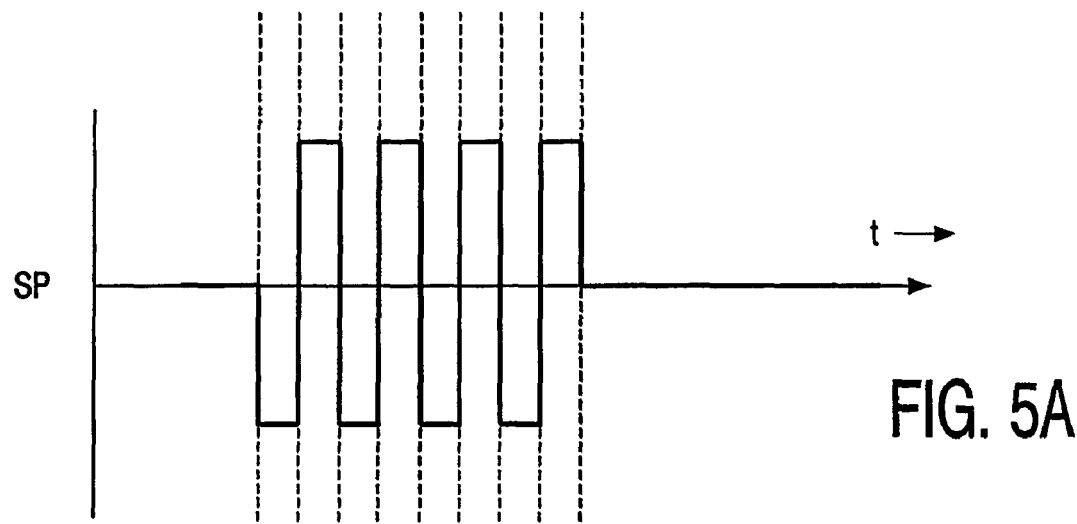
Figure 5B:
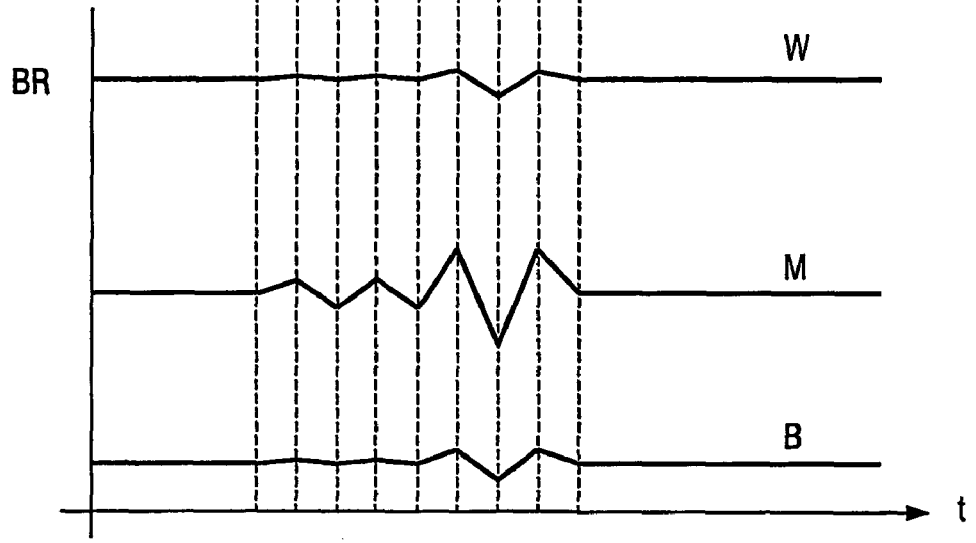

FIG. 5 shows the influence of shaking pulses on the brightness of a pixel. FIG. 5A shows a pixel voltage VD comprising a series of shaking pulses SP. In FIG. 5B, the upper line indicated by W shows the influence of the series of shaking pulses SP on a pixel 18 which is in the limit optical state white. The middle line indicated by M shows the influence of the series of shaking pulses SP on a pixel 18 which is in an intermediate optical state middle grey. The lower line indicated by B shows the influence of the series of shaking pulses SP on a pixel 18 which is in the limit optical state black. If the particles have other colors than white and black, the limit states have this other colors, respectively.

It is clearly illustrated that the effect of the same series of shaking pulses SP on the brightness is less for limit optical states B, W than for the intermediate optical state M.

FIG. 6 shows an embodiment in accordance with the invention of shaking pulses of which an energy content depends on the optical state of the pixel. FIG. 6A shows the pixel voltage VD indicated by SPL1 which comprises the series of shaking pulses applied to pixels 18 which are in, or near to, one of the two limit optical states. With near a limit optical state is further meant also including the limit optical state. The color of a pixel 18 seen by a viewer depends on the color of the particles used. FIG. 6B shows the pixel voltage VD indicated by SPM1 which comprises the series of shaking pulses applied to pixels 18 which are near to a middle optical state which occurs when the particles are mixed. If white and black particles are used, the limit optical states are black and white, and the middle optical state is middle grey.

The amplitude A and -A and the duration TR1 of the pulses of the series of shaking pulses SPL1 and SPM1 are equal. The series of shaking pulses SPL1 lasts from instant t0 to instant t2, the series of shaking pulses SPM1 lasts from instant t0 to t1. Thus, the duration the shaking pulses SPM1 are applied is shorter than the duration the shaking pulses SPL1 are applied, and consequently the energy content of the series of shaking pulses SPL1 is larger than that of the series of shaking pulses SPM1. The disturbance caused by both the series of shaking pulses SPL1 and SPM1 on the brightness will become more equal.

It is possible to gradually increase the number of pulses in the series of shaking pulses SP starting from the number of pulses suitable for the middle optical state as a function of the optical state of the pixel. It is also possible to select from a predetermined number of numbers. It is not relevant that all the series of shaking pulses start at the same instant t0.

FIG. 7 shows an embodiment in accordance with the invention of shaking pulses of which an energy content depends on the optical state of the pixel. FIG. 7A shows the pixel voltage VD indicated by SPL2 and comprising a series of shaking pulses which is applied to pixels 18 which near one of the two limit optical states. FIG. 7B shows the pixel voltage VD indicated by SPM2 and comprising a series of shaking pulses which is applied to pixels 18 which are near to a middle optical state which occurs when the particles are mixed.

The amplitude A and −A and the number of the pulses of the series of shaking pulses SPL2 and SPM2 are equal. The series of shaking pulses SPL2 lasts from instant t10 to instant t12, the series of shaking pulses SPM2 lasts from instant t10 to t11. The duration TR2 of the pulses of the series of shaking pulses SPL2 is twice the duration TR1 of the pulses of the series of shaking pulses SPM2. Thus, the energy content of the series of shaking pulses SPL2 is larger than that of the series of shaking pulses SPM2. The disturbance caused by both the series of shaking pulses SPL2 and SPM2 on the brightness will become more equal.

It is possible to gradually increase the duration of pulses in the series of shaking pulses SP starting from the duration TR1 of pulses suitable for the middle optical state as a function of the optical state of the pixel 18. It is also possible to select from a predetermined number of possible durations. It is not relevant that all the series of shaking pulses start at the same instant t0.

FIG. 8 shows an embodiment in accordance with the invention of shaking pulses of which an energy content depends on the optical state of the pixel. FIG. 8A shows the series of shaking pulses SPL3 applied to pixels 18 which near one of the two limit optical states. FIG. 8B shows the series of shaking pulses SPM3 applied to pixels 18 which are near to a middle optical state which occurs when the particles are mixed.

The number of the pulses of the series of shaking pulses SPL3 and SPM3 and the duration these pulses are applied are equal. Both the series of shaking pulses SPL3 and SPM3 last from instant t20 to instant t21. Both the pulses of the series of shaking pulses SPL3 and SPM3 have a duration or pulse width TR1. The amplitude of the pulses of the series of shaking pulses SPL3 is larger than the amplitude of the pulses of the shaking pulses SPM3. Thus, the energy content of the series of shaking pulses SPL3 is larger than that of the series of shaking pulses SPM3. The disturbance caused by both the series of shaking pulses SPL3 and SPM3 on the brightness will become more equal.

It is possible to gradually increase the amplitude of pulses in the series of shaking pulses SP starting from the amplitude suitable for the middle optical state as a function of the optical state of the pixel 18. It is also possible to select from a predetermined number of possible amplitudes.

It should be noted that the above-mentioned embodiments illustrate rather than limit the invention, and that those skilled in the art will be able to design many alternative embodiments without departing from the scope of the appended claims. For example, any combinations of the characteristics of the shaking pulses may be used to obtain a different energy content.

In the claims, any reference signs placed between parenthesis shall not be construed as limiting the claim. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

The invention claimed is:

1. An electrophoretic display comprising:
   at least one pixel comprising electrophoretic material, a first electrode and a second electrode, and
   an addressing circuit for addressing the at least one pixel by applying a drive pulse and shaking pulses between the first electrode and the second electrode:
   the drive pulse having a level in accordance with an optical state to be reached by the at least one pixel, and
   the shaking pulses having an energy content depending on an optical state of the at least one pixel being near or at limit optical states or at intermediate optical states of the at least one pixel, and wherein the shaking pulses comprise at least three pulses, wherein the addressing circuit is arranged for providing shaking pulses having a first energy content when the optical state of the at least one pixel is near or at limit optical states where the electrophoretic material is near the first electrode or the second electrode, and for providing shaking pulses having a second energy content when the optical state of the at least one pixel is at intermediate optical states where the electrophoretic material is away from the first electrode and the second electrode, the second energy content of the shaking pulses being lower that the first energy content to reduce movement of the electrophoretic material located away from the first electrode and the second electrode to reduce influencing the intermediate optical states of the at least one pixel so that both image retention and image update visibility due to the shaking pulses are reduced and disturbances caused by the shaking pulses having the first energy content and the second energy content on brightness of the at least one pixel in the limit optical states and the intermediate optical states are substantially equal.

2. The electrophoretic display as claimed in claim 1, wherein the addressing circuit is arranged for varying the energy content by controlling a number of the shaking pulses depending on the optical state of the at least one pixel.

3. The electrophoretic display as claimed in claim 1, wherein the addressing circuit is arranged for varying the energy content by controlling a repetition period of the pulses of the shaking pulses depending on the optical state of the at least one pixel.

4. The electrophoretic display as claimed in claim 1, wherein the addressing circuit is arranged for varying the energy content by controlling an amplitude of the pulses of the shaking pulses depending on the optical state of the at least one-pixel.

5. The electrophoretic display as claimed in claim 1, wherein the addressing circuit is arranged for supplying the shaking pulses preceding a reset pulse, the reset pulse preceding the drive pulse for obtaining a limit optical state of the at least one pixel.

6. The electrophoretic display as claimed in claim 1, wherein the addressing circuit is arranged for supplying the shaking pulses directly preceding the drive pulse.

7. A display apparatus comprising an electrophoretic display as claimed in any one of the claims 1 to 6.

8. A method of addressing an electrophoretic display with at least one pixel comprising electrophoretic material, a first electrode and a second electrode, the method comprising the acts of:
addressing the at least one pixel by applying a drive pulse and shaking pulses between the first electrode and the second electrode:
the drive pulse having a level in accordance with an optical state to be reached by the at least one pixel, and
the shaking pulses having an energy content depending on an optical state of the at least one pixel being near or at limit optical states or at intermediate optical states of the at least one pixel, wherein the shaking pulses comprise at least three pulses,
providing shaking pulses having a first energy content when the optical state of the at least one pixel is near or at limit optical states where the electrophoretic material is near the first electrode or the second electrode; and
providing shaking pulses having a second energy content when the optical state of the at least one pixel is at intermediate optical states where the electrophoretic material is away from the first electrode and the second electrode,
wherein the second energy content of the shaking pulses is lower that the first energy content to reduce movement of the electrophoretic material located away from the first electrode and the second electrode to reduce influencing the intermediate optical states of the at least one pixel so that both image retention and image update visibility due to the shaking pulses are reduced and disturbances caused by the shaking pulses having the first energy content and the second energy content on brightness of the at least one pixel in the limit optical states and the intermediate optical states are substantially equal.

9. The electrophoretic display of claim 1, wherein the shaking pulses having the first energy content start at a first time interval before the drive pulse and the shaking pulses having the second energy content start at a second time interval before the drive pulse, the first time interval being different from the second time interval.

10. The method of claim 8, wherein the shaking pulses having the first energy content start at a first time interval before the drive pulse and the shaking pulses having the second energy content start at a second time interval before the drive pulse, the first time interval being different from the second time interval.

* * * * *